G. P. KOCH.
CAMERA.
APPLICATION FILED JUNE 28, 1916.
1,265,456.
Patented May 7, 1918.
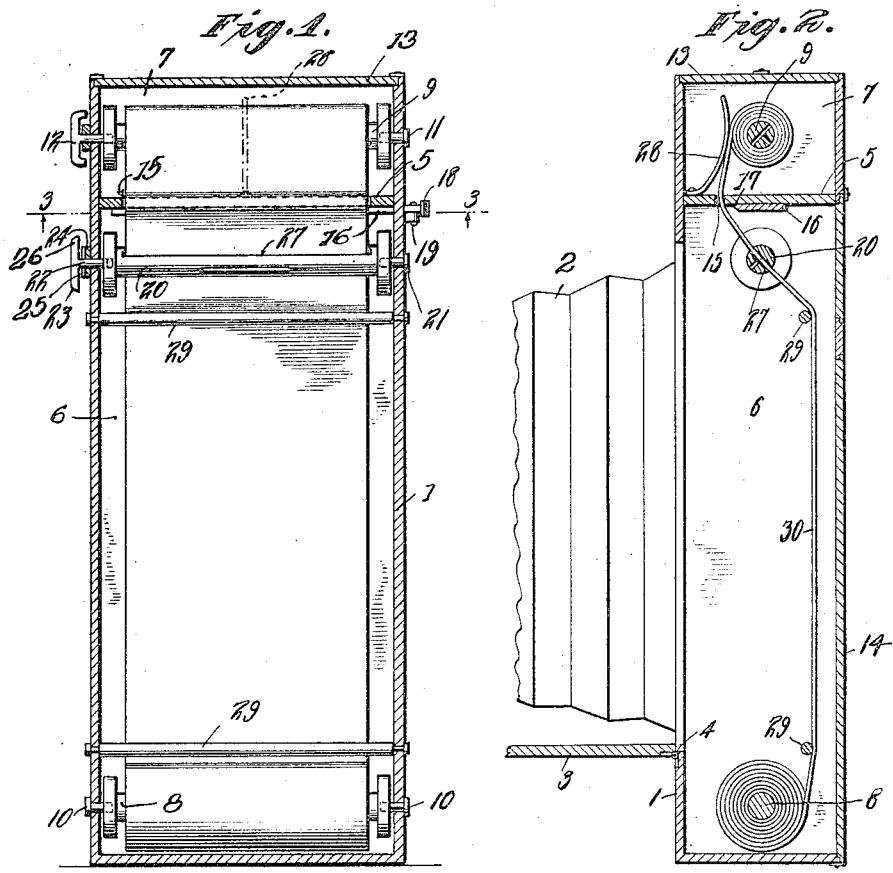
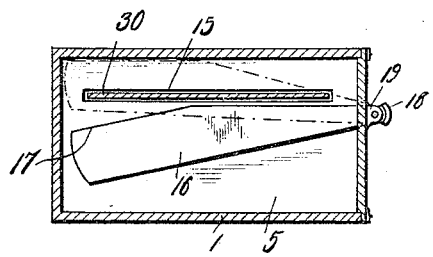
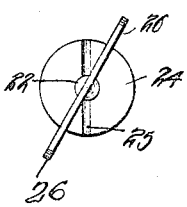
INVENTOR
George P. Koch
WITNESSES
BY
ATTORNEY

UNITED STATES PATENT OFFICE.

GEORGE PETER KOCH, OF NEW BRUNSWICK, NEW JERSEY.

CAMERA.

1,265,456.

Specification of Letters Patent.

Patented May 7, 1918.

Application filed June 28, 1916. Serial No. 106,413.

*To all whom it may concern:*

Be it known that I, GEORGE P. KOCH, a citizen of the United States, residing at New Brunswick, in the county of Middlesex and State of New Jersey, have invented certain new and useful Improvements in Cameras, of which the following is a specification.

This invention has relation to cameras of the roll film type, and the nature and objects thereof will be readily apparent to those skilled in the art to which it appertains, in the light of the following description of the accompanying drawings, illustrating, what I now believe to be the preferred embodiment, or mechanical expression of my invention, from among other forms and arrangements, within the spirit thereof, or the scope of the appended claims.

However, an object of the invention is to provide a camera employing a sensitive medium in the form of a strip of material, known as roll film, and embodying means whereby a portion of said film may be detached from the remainder, and removed from the camera for immediate development, without disturbing the remainder of the unexposed film.

Another object of the invention is to provide means in a camera having the above named characteristics, whereby the detached portion of the film may be removed from the camera in the presence of daylight, or other actinic light, without possibility of affecting the sensitive surface of the film.

In addition to the foregoing, my invention comprehends improvements in the details of construction, and arrangements of parts to be hereinafter described, and particularly pointed out in the appended claims.

In the accompanying drawings, in which similar and corresponding parts are designated by the same characters of reference throughout the several views in which they appear;

Figure 1, is a longitudinal section taken through the body portion of a roll film camera, of the folding type, and embodying my improvements.

Fig. 2, is a longitudinal section similar to the foregoing figure, but taken in a plane at right angles thereto.

Fig. 3, is a transverse section taken on the line 3—3 of Fig. 1.

Fig. 4, is a detail view of the winding key of the intermediate spool, and,

Fig. 5, is a detail section through a portion of the improved film backing strip employed in connection with my camera.

With reference to the drawings, 1 indicates the casing or body portion of a camera of the folding type, and 2 the bellows, designed to be folded into the casing, and supported upon a support 3 hingedly connected at 4 to the casing. The interior of the casing is provided with a transverse partition 5 defining a chamber 6, which in the conventional type of camera constitutes the chamber in which the film is exposed to the light passing through the camera lens, and a chamber 7 at one end of the casing, said chamber being smaller than the chamber 6, and constituting an improvement occasioned by this invention.

Unwinding and winding spools 8 and 9 respectively are provided in the chamber 6 at one end thereof, and in the chamber 7. The spool 8 is supported upon studs 10, while the spool 9 is supported at one end upon a stud 11, and at its other end upon a reciprocable winding key 12, which may be withdrawn from engagement with said spool to permit its removal from the camera. The end of the casing containing the compartment 7 is detachable as at 13 whereby the interior of said compartment may be exposed. The interior of the chamber 6 may also be exposed owing to the provision of a detachable back 14.

The partition 5 is provided with a narrow aperture 15 extending transversely of the casing to a distance equal to the width of the film strip for which the camera is designed. A cutting blade 16, provided with an angular cutting edge 17 is provided for movement in close relation to the partition 5, and is provided with a handle portion 18 which extends through an opening in the wall of the casing, and is pivoted upon an ear 19 located on the casing adjacent said opening. The blade is situated so as to intersect the aperture 15 during its movement, and to completely cover the same.

An intermediate spool 20 is provided within the chamber 6 and adjacent the partition 5, and is supported at one end upon a stud 21, and at its other end upon the shank 22 of a winding key 23, which extends through an opening in a side wall of the casing and an enlargement 24, having on its face a diametrical recess 25. The said key 23 is reciprocable and its shank is splined into the end of the spool. The winding key is formed with a head having oppositely extending portions 26 which may be seated in the recess 25, thereby locking said key to the enlargement 24. The spool 20 is formed with an opening 27 extending diametrically therethrough, and longitudinally thereof to a distance equal to the width of the strip of film, for a purpose to be presently noted. A flat spring member 28 is secured at one end to the side of the partition, interiorly of the chamber 7, with its free end adapted to bear against the intermediate portion of the spool 9, or the film which may be thereon.

In the operation of my improved camera, the roll of film which is supplied upon a spool corresponding to the spool 8 is placed within the chamber 6 and supported upon the studs 10. The end of the backing strip is then drawn over idler rollers 29, spaced apart to a distance which defines the length of the strip of film to be used for one exposure, and is then threaded through the opening 27 of the spool 20, then through the aperture 15 in the partition 5, and finally secured to the spool 9. During the foregoing operation, the winding key 23 should be depressed, so as to seat its head within the recess 25 of the enlargement 24, thereby retaining the spool 20 against rotation.

To prepare the camera for taking a picture, the winding key 12 of the spool 9 is rotated until the first exposure area of the sensitive film is positioned behind the lens. One exposure after another may be made, and the spool 9 rotated to wind thereon the exposed film, after the fashion of the conventional camera of this type.

Presuming that a portion of the strip has been exposed, and it is desired to detach the exposed strip for development, the cutting blade 16 is brought into engagement with the strip by operating the handle 18, thereby severing the strip at the partition. By rotating the spool 9, the end of the detached portion may be wrapped around the rolled portion of the film, and by detaching the end 13 of the casing, the spool 9 may be removed from the casing. It will be noted that owing to the engagement of the spring member 28 against the rolled film, the unwrapping of the film is prevented. Attention is also called to the fact that after the blade 16 has been moved to cutting position, it covers the opening 15 in the partition, thereby forming a closure for the chamber 6, and preventing the entrance of light thereinto.

The remaining portions of the film may be disposed for exposure, and displaced after exposure by rotating the spool 20 by means of the winding key 23, which must first be withdrawn from engagement with the enlargement 24. The spool 20 thus serves as the winding spool in lieu of the spool 9. It will be obvious however, that after a detachment of a portion of the film, the remainder must be completely wound upon the spool 20, and is not capable of a second division. The backing strip 30 of the film may be provided at uniformly spaced intervals with tabs 31, secured at one edge to said strip and having its free edge bent upon itself and formed with an inner gummed surface. This affords an arrangement whereby the severed end of the detached film may be secured to the rolled portion thereby preventing unwinding of the roll. The tabs 31 should be obviously located at the end of each exposure area of the film.

Thus it will be seen that I have provided an improvement in the film camera whereby an exposed portion of the film may be detached from the remainder, thereby permitting its immediate development without the necessity of waiting until the unused portion of the film has been exposed. I have also provided means whereby the detached portion may be removed from the camera in daylight, without possibility of affecting the exposed portion, or the remainder of the film within the camera, as previously explained.

While I have illustrated and described my invention with some degree of particularity, I realize that in practice various alterations thereover may be made, and I therefor reserve the right and privilege of changing the form of the details of construction, or otherwise altering the arrangement of the correlated parts without departing from the spirit of the invention, or the scope of the appended claims.

I am aware that arrangements have been provided in roll film cameras for severing an exposed section from a roll of film, for immediate development, and also cameras in which an intermediate roller is provided over which the film passes. Hence it is not either of these features singly which constitutes my invention, but the herein described combination of elements, capable of performing the functions set forth and therefor;

Having thus described my invention what I claim as new and desire to secure by Letters Patent is:

1. The combination with a camera including an unwinding spool, and a removable winding spool for supporting a strip of film therebetween, of means for severing an exposed section of film which has been wound around the winding spool, thereby permitting the winding spool containing the exposed section to be removed from the camera, and an intermediate spool upon which the severed end of the unexposed section may be wound, and a slotted partition between said unwinding and winding spools.

2. The combination with a camera including an unwinding spool and a removable winding spool for supporting a strip of film therebetween, of means for severing an exposed section of film which has been wound upon the winding spool, an intermediate spool formed with an opening through which the film passes, whereby the severed end of the unexposed section may be supported thereby and wound thereupon, and a slotted partition between said unwinding and winding spool.

3. The combination with a camera including a casing, a partition therein having an opening and defining a major compartment, and an end compartment within the casing, an unwinding spool in the end of the major compartment opposite the end compartment, a winding spool within the end compartment, for supporting a strip of film which passes through the partition opening, means for severing a section of exposed film which has been wound upon the winding spool, and an intermediate slotted spool through which the film passes and located adjacent the partition within the major compartment for supporting the severed end of the unexposed film section, and for winding the film thereupon to expose the remainder.

4. The combination with a camera including an unwinding spool and a removable winding spool for supporting a strip of film therebetween, a slotted partition between said spools, of means adjacent said partition for severing an exposed section of the film which has been wound upon the winding spool, an intermediate slotted spool through which the film passes, and means for locking the intermediate spool against rotation before the film is severed, said means being releasable and operable to rotate the spool after the severing operation to wind the severed end of the unexposed section of the film thereabout.

5. The combination with a camera including an unwinding spool and a removable winding spool for supporting a film therebetween, a slotted partition between said spools, of an intermediate slotted spool through which the film passes, a reciprocable key mounted in the casing of the camera and splined to the intermediate spool, an enlargement on the casing having a recess, a head portion on the key adapted to be seated in the recess to lock the spool against rotation, said key being releasable to permit rotation, and means for severing an exposed section of the film which has been wound upon the winding spool, the intermediate spool supporting the severed end of the unexposed section and adapted to wind said end thereabout.

In testimony whereof I affix my signature in presence of two witnesses.

GEORGE PETER KOCH.

Witnesses:
 ANNETTE V. MARTIN,
 HELEN R. REILLEY.

Copies of this patent may be obtained for five cents each, by addressing the "Commissioner of Patents, Washington, D. C."